(12) United States Patent
Adachi

(10) Patent No.: US 7,603,564 B2
(45) Date of Patent: Oct. 13, 2009

(54) LOGIN DEVICE AND CONTROL METHOD OF THE SAME, DATA PROCESSING DEVICE AND METHOD

(75) Inventor: Tomoko Adachi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 10/781,638

(22) Filed: Feb. 20, 2004

(65) Prior Publication Data
US 2004/0168092 A1    Aug. 26, 2004

(30) Foreign Application Priority Data
Feb. 21, 2003    (JP)    ............................... 2003-044485

(51) Int. Cl.
*G06F 21/00* (2006.01)
(52) U.S. Cl. ...................... 713/183; 713/170; 713/184; 726/16; 726/28; 707/9; 709/229

(58) Field of Classification Search .................. 713/184
See application file for complete search history.

(56) References Cited

U.S. PATENT DOCUMENTS

| 5,666,502 | A | * | 9/1997 | Capps .......................... 715/811 |
| 5,684,957 | A | * | 11/1997 | Kondo et al. ................... 726/25 |
| 7,216,292 | B1 | * | 5/2007 | Snapper et al. ............. 715/507 |
| 2003/0074343 | A1 | * | 4/2003 | Onuki ........................... 707/1 |

* cited by examiner

*Primary Examiner*—Nasser G Moazzami
*Assistant Examiner*—Shewaye Gelagay
(74) *Attorney, Agent, or Firm*—Fitzpatrick, Cella, Harper & Scinto

(57) ABSTRACT

In a device for performing login processes by storing authentication information for a plurality of users, information indicating whether or not a login history is left, is set for each user and login histories are held according to the set information. User identification information is displayed on the basis of these held login histories and any piece of the user identification information is selected at a login operation so that the user identification information is entered at the login operation.

14 Claims, 17 Drawing Sheets

FIG. 3

| User ID | User Name | User Password | User Level | User Type | HISTORY REQUEST Flag | |
|---|---|---|---|---|---|---|
| 1 | KIMURA | **** | 0 | 1 | 1 | ~307 |
| 2 | NAKAI | **** | 1 | 1 | 1 | ~308 |
| 3 | KUSANAGI | **** | 1 | 1 | 1 | ~309 |
| 4 | KATORI | **** | 1 | 1 | 1 | ~310 |
| 5 | INAGAKI | **** | 1 | 1 | 1 | ~311 |
| 6 | JOUJIMA | **** | 1 | 0 | 1 | ~312 |
| 7 | KOKUBUN | **** | 1 | 0 | 0 | ~313 |
| 8 | YAMAGACHI | **** | 1 | 0 | 1 | ~314 |
| 9 | NAGASE | **** | 1 | 0 | 1 | ~315 |
| 10 | YOSHIOKA | **** | 1 | 0 | 1 | ~316 |
| 11 | SAKURAI | **** | 1 | 0 | 1 | ~317 |
| ⋮ | ⋮ | ⋮ | ⋮ | ⋮ | ⋮ | |
| 100 | - | - | 1 | 1 | 0 | ~318 |

Columns: 301, 302, 303, 304, 305, 306 — 210a

| No. | NON-DEFAULT USER WHO HAS LOGGED IN |
|---|---|
| 1 | 6 |
| 2 | 8 |
| 3 | 10 |
| 4 | 11 |
| 5 | 9 |

| No. | DEFAULT USER WHO HAS LOGGED IN |
|---|---|
| 1 | 4 |
| 2 | 3 |
| 3 | 5 |
| 4 | 1 |
| 5 | 2 |

701  702

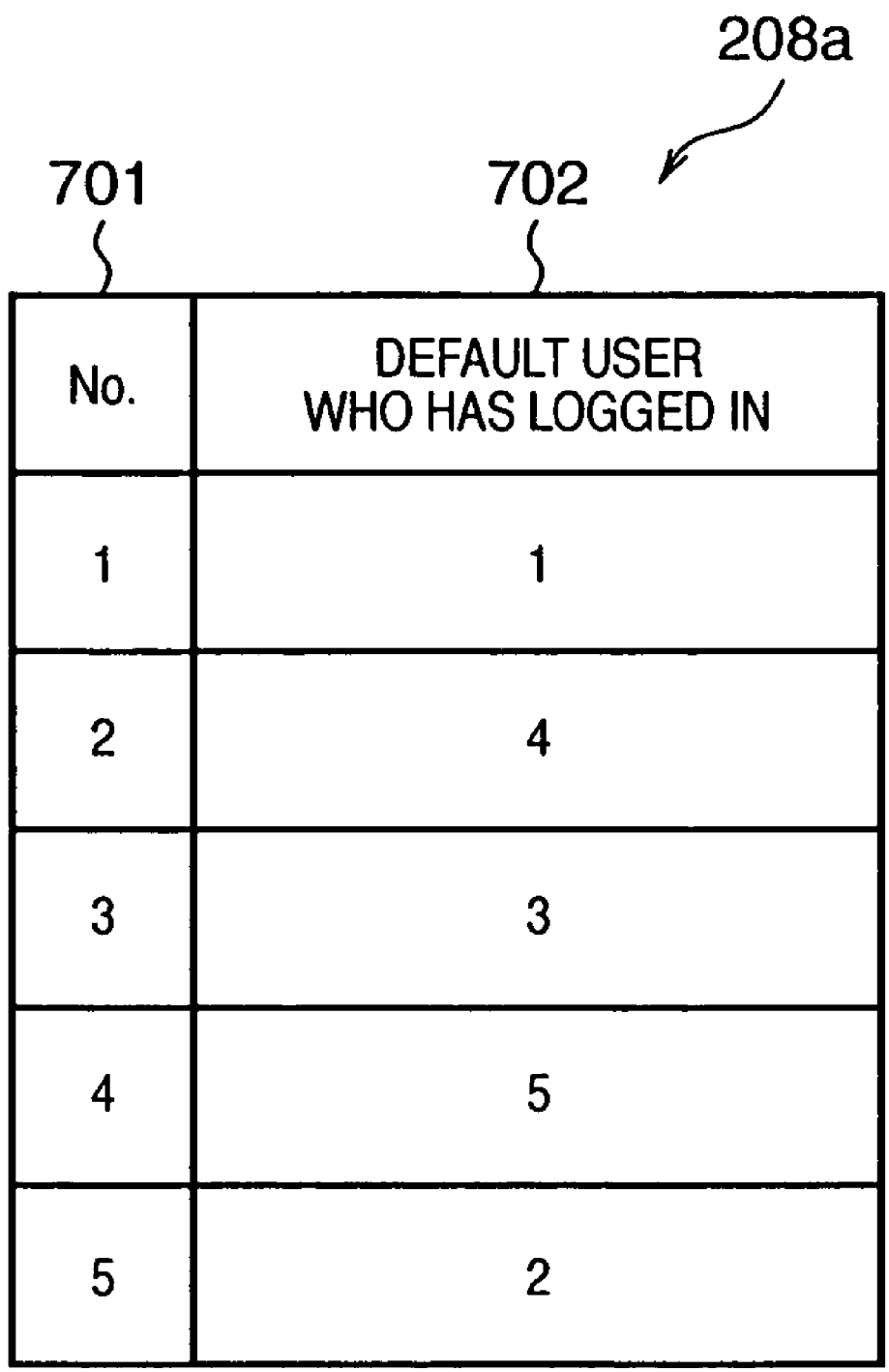

LOGIN DEVICE AND CONTROL METHOD OF THE SAME, DATA PROCESSING DEVICE AND METHOD

FIELD OF THE INVENTION

The present invention relates to a login technique suitable for a networked device and a network system including the networked device. More specifically, the present invention is suitable for a login process on a peripheral device used by a plurality of users.

BACKGROUND OF THE INVENTION

Login actions are required to use various peripheral devices (e.g., devices such as a printer, a copy machine, a facsimile) having an authentication function connected to a network. In general, a user inputs a username and password through a login screen in this kind of login action. In other words, in a login system, a user can log into a peripheral device by typing the user's username, password and the like with ten keys and a keyboard.

The aforementioned conventional art requires a user to type in a username, password and the like with ten keys and/or a keyboard and the like anytime the user logs in. Although this login action is indispensable in terms of security, the more frequently a user uses a peripheral device, the more the user is bothered by the login action.

As an approach to simplify a login action, there is a method to facilitate entering username by displaying all usernames of the users who are allowed to log in on a login screen for user's selection. However, a login screen on a peripheral device is limited in space, and all users do not always use the device frequently, and all users do not always want their username to be displayed. This leads a problem in that displaying of unnecessary usernames disturbs a login action by a user who frequently uses the device.

To solve this problem, a system has been proposed to simplify a "login name entering" action by holding a login history of a user who has logged into a device, displaying a username of each user whose login history is hold on a login screen, and making a user select the user's username from the displayed usernames. In this kind of system, however, even a user whose login history does not need to be left (e.g. a user who rarely uses a device), leaves a login history. Therefore, even with the simplified "login name entering" action, a "login name searching" action still bothers a user.

SUMMARY OF THE INVENTION

The present invention is adapted in view of the aforementioned problem and intends to simplify a user's login operation.

According to one aspect of the present invention, there is provided a device for performing login processes, comprising: storage means for storing authentication information on a plurality of users; setting means that can set up information indicating to leave a history for each user; holding means for holding a login history in accordance with the information set up by the setting means; displaying means for displaying user identification information on the basis of the login history held in the holding means for a login operation; and entering means for entering user identification information at a login operation by making any piece of the user identification information displayed on the displaying means to be selected.

According to another aspect of the present invention, there is provided a data processing device displaying an entry screen for entering user identification information and password information, comprising: storage means for storing user identification information and password information for each of a plurality of users, the user identification information and the password information being associated with each other; setting means that can set whether to leave user identification information for each piece of user identification information; and display controlling means for selectively displaying user identification information that is set to be left by the setting means on the entry screen, wherein the user identification information selected on the entry screen is processed as entered user identification information on the entry screen.

According to the present invention, a login control method for the abovementioned login device and a data processing method for the data processing device are also provided.

Other features and advantages of the present invention will be apparent from the following description taken in conjunction with the accompanying drawings, in which like reference characters designate the same or similar parts-throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is an exemplary data structure for authentication DataFile that has registered users who are allowed to use the device;

FIG. 6 shows an exemplary login histories File for non-default users 208b that is held in login history holding part 208 in peripheral device 201;

FIG. 7 shows an exemplary login histories File for default users 208a that is held in a device;

FIG. 8 is a chart illustrating an updating way of login histories File for default users 208a;

DETAILED DESCRIPTION OF THE PREFERRED EMBODIMENTS

Preferred embodiments of the present invention will now be described in detail in accordance with the accompanying drawings.

A login system according to the embodiment has an authentication mechanism that holds user information (authentication DataFile) such as a username and password of a user who is allowed to login, and authenticates a user based on the information, as further described below. This login system has a mechanism to hold login histories of users, with the number of users whose login histories are held being able to set. When a user logs into a device, a list of usernames for the number of users whose login histories are set to be held is displayed on a login screen according to the order of the login histories in order to simplify a user's login action.

It can also be set whether a login history is held or not for each user. In this case, login histories are maintained only for the users set as "to be held." This makes displaying of users in a login operation more useful.

Figure 1:
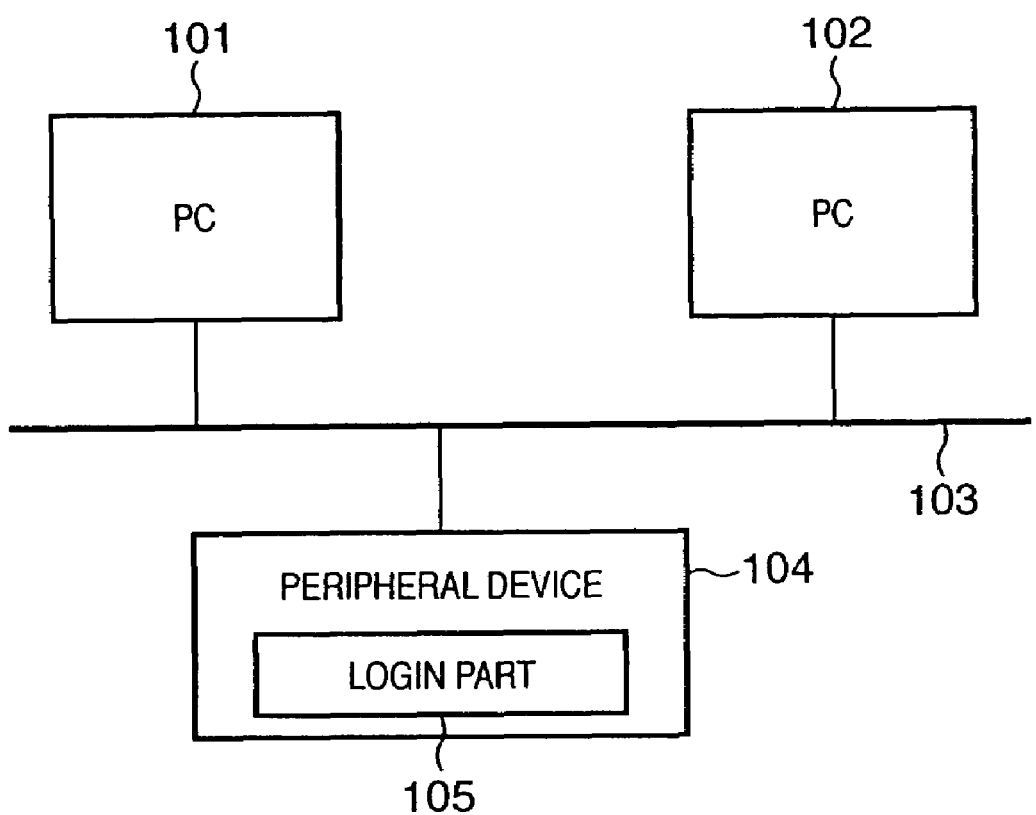
FIG. 1 is a system block diagram distinguishing components of a login system according to the embodiment.

FIG. 1 is a system block diagram distinguishing components of a login system according to the present embodiment. As shown in FIG. 1, login system according to the embodiment is configured by connecting client terminal device (hereinafter refereed to as PC) 101, 102, and peripheral device 104 including login part 105 to network 103. Although two PC's, 101, 102 connected to a network are shown in the drawing, one or more than two PC's may be used.

Figure 2:
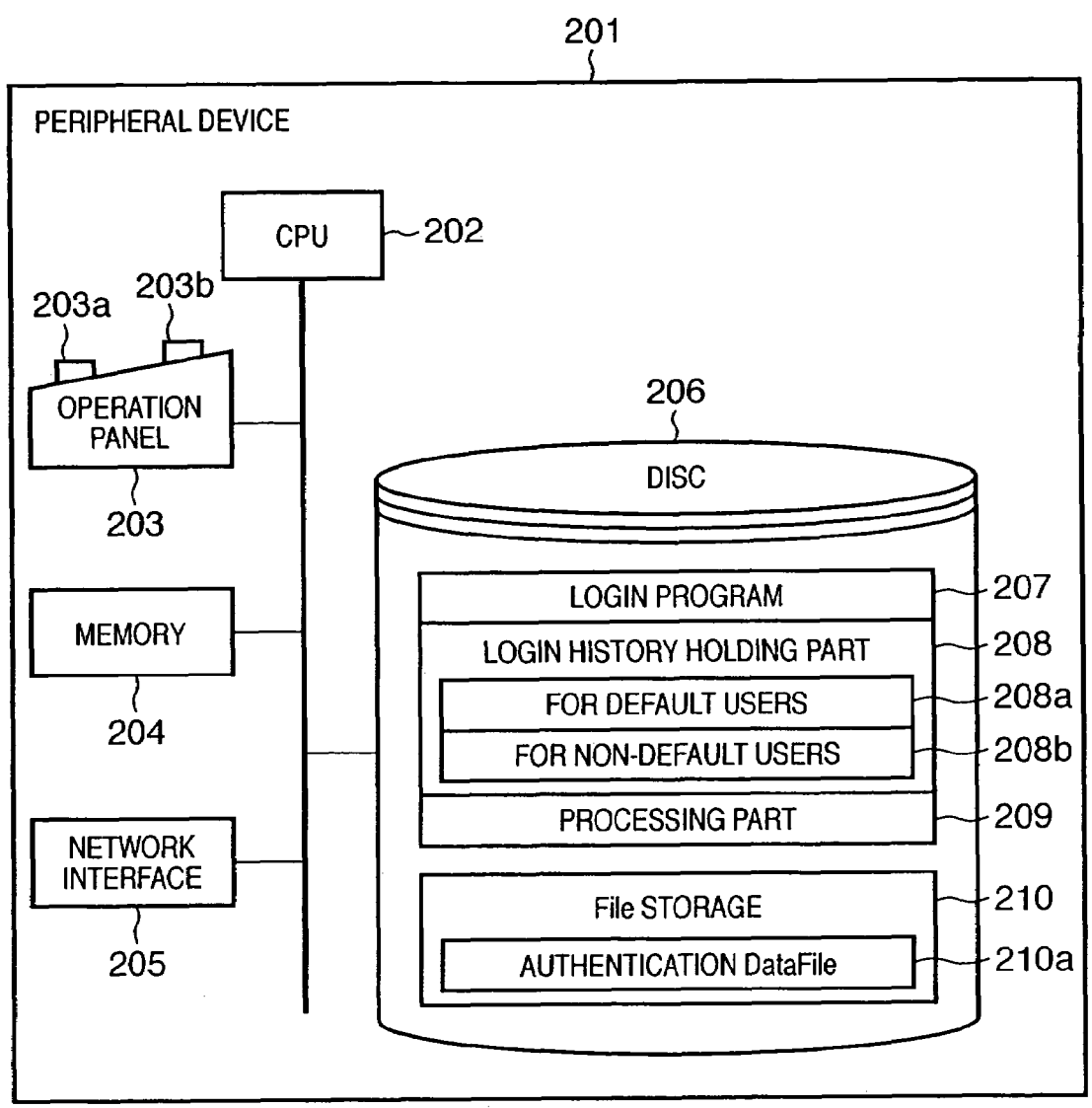
FIG. 2 is a hardware block diagram of a peripheral device with a login system according to the embodiment.

FIG. 2 is a hardware block diagram of a peripheral device with a login system according to the embodiment. Peripheral device 201 corresponds to peripheral device 104 shown in the abovementioned FIG. 1. As shown in FIG. 2, peripheral device 201 includes CPU 202, operation panel 203, memory 204, disc 206, and interface 205 for connecting peripheral device 201 to a network. Operation panel 203 has display part 203a and operation part 203b. Disk 206 has login program 207, login history holding part 208, processing part 209, and File storage 210. An authentication function of peripheral device 201 is implemented by referring to authentication DataFile 210a held in File storage 210. A login history holding function of the embodiment is implemented with login history-holding part 208 containing login histories of default users 208a and login histories of non-default users 208b, login program 207, and processing part 209.

Peripheral device 201 is, for example, a printer, a copy machine, a scanner, a facsimile, etc. These devices are shared by a plurality of users. And their display screens are smaller than that of a personal computer. A login action is facilitated by holding login histories for set number and displaying a list of usernames according to the order of login histories.

FIG. 3 is an exemplary data structure for authentication DataFile that has registered users who are allowed to use the device. Authentication DataFile also includes User ID 301, User Name 302, User Password 303, User Level 304, User Type 305, and history request Flag 306. Other type of user information can be held along.

User ID 301 denotes a number uniquely assigned to each of the registered user. The maximum value of User ID 301 is the possible registration number of users who are allowed to use the device. In the case of FIG. 3, User ID=100, meaning users up to 100 can be registered to use the device. User Name 302 shows a username (User Name) for each user. In order to log in, a user uses a username that has been registered in User Name 302.

User Password 303 is a password for each user. Upon logging in, a user is required to enter a username and password that have been registered in User Name 302 and User Password 303. When the entered username and password matches with contents of authentication DatFile 210a, the user is allowed to log into the device.

User Level 304 is a flag indicating a status of a user with respect to a device. User Level=0 indicates a device administrator, and User Level=1 indicates a general user. Among other users, a device administrator administers the peripheral device and performs various kinds of maintenance on the device. A device administrator can handle various types of management including privileged processing. In the embodiment, a device administrator can set at least User Type 305, the number of users of User Type=1 (default users) (FIG. 4), the number of the non-default users whose login histories can be held (FIG. 5). A general user is a user who is not authorized to perform privileged processing.

User Type 305 indicates whether a user is a default user or a non-default user of the device. User Type=1 indicates a default user of the device, and User Type=0 indicates a non-default user of the device. In the embodiment, "default user" and "non-default user" is classification of users according to their usage of the device. A default user is a user selected based on frequency in use of the device and the like. The number of the default users is set by a device administrator in the abovementioned manner. The remaining users are non-default users. A device administrator determines which user to be a default user. In other words, a device administrator can change and set the value of User Type 305.

History request Flag 306 indicates whether a user wants the device to hold the user's login history or not. Flag=1 indicates that the user wants the user's login history to be held, and Flag=0 indicates that the user does not want the user's login history to be held. The value of this history request Flag 306 can be changed according to the user's intention (described below).

Figure 4:
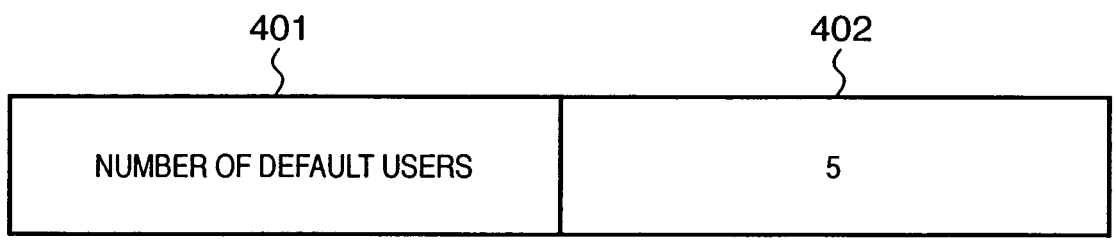
FIG. 4 shows the registered number of default users who are held in the device.
Figure 5:
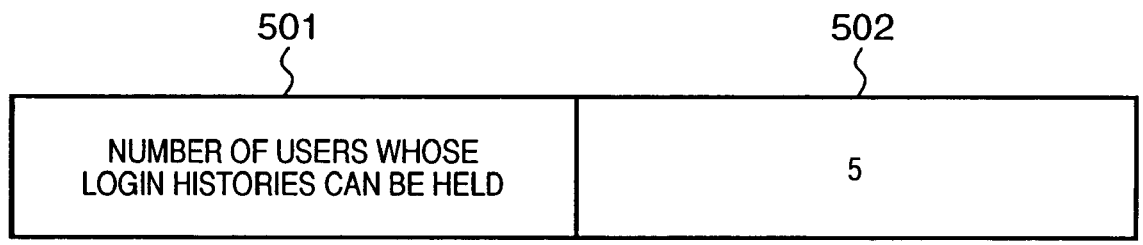
FIG. 5 shows the registered number of non-default users who are held in the device.

FIG. 4 shows the registered number of default users who are held in the device. In a login system of the embodiment, login histories of default users are always held in peripheral device 201 and the usernames are displayed on a login screen (described below). However, all the users cannot be made default users unlimitedly. In the embodiment, a device administrator is authorized to set the number of default users. The number of default users is registered in 402 of FIG. 4. In the embodiment, there are five default users.

When a user is a non-default user but frequently uses the device, it is also bothersome for the user to type the username each time to logs in. In this login system, peripheral device 201 holds login histories of the set number of non-default users and displays the usernames on a login screen. This simplifies a login action for non-default users.

FIG. 5 shows the registered number of non-default users whose login histories can be held. In 502, the number of default users whose login histories can be held in the device is registered. A device administrator can set the value. In FIG. 5, the number of default users whose login histories can be held is five.

FIG. 6 shows an exemplary login histories File for non-default users 208b that is held in login history holding part 208 in peripheral device 201. Login histories File 208b consists of number 601 and the "non-default user who has logged in" 602. The value in "the non-default user who has logged in" 602 is the User ID 301 of the user who has been registered in authentication DataFile 210a shown in FIG. 3. The value in "the non-default user who has logged in" 602 may be any value that can identify a user, e.g., User Name 302, instead of User ID 301 shown in FIG. 3.

When the number of non-default users is set to five as shown in FIG. 5, the number of non-default users whose login histories can be held is also set to five. Therefore, in FIG. 6, number 601 ranges from 1 to 5. If different number of default users is set, the number of default users whose login histories is held is also that different number. In the embodiment, the smaller the number 601, the later the login history. The last non-default user who used the device is the non-default user of User ID=6.

FIG. 7 shows an exemplary login histories File for default users 208a that is held in a device. Login histories File 208a consists of number 701 and the "default user who has logged in" 702. "Default user who has logged in" 702 is the User ID 301 of the user who has been registered in authentication DataFile 210 shown in FIG. 3. The value in the "default user who has logged in" 702 may be any value that can identify a user, for example, User Name 302, instead of User ID 301.

As the number of default users is set to five as shown in FIG. 4, the number of default users whose login histories can be held is also five. Therefore, number 701 ranges from 1 to 5. The smaller the number 701, the later the login history. The last default user who used the device is a default user of User ID=4.

Next, an updating way of login histories File for default users 208a will be described with reference to FIGS. 7 and 8. According to login histories File for default users 208a shown in FIG. 7, the default users who have logged in the device are, in chronological order, User ID=2, User ID=1, User ID=5, User ID=3, and the last default user who used the device is User ID=4.

When the default user of User ID=1 logs in the device, the device updates login histories File for default users 208a as shown in FIG. 8. As User ID=1 who was at No. 4 in FIG. 7 has logged in, the history of User ID=1 moves up to "1", the latest login user, and default users who were at "3", "2", and "1", that is, User ID=5, User ID=3, and User ID=4 collectively shift to "4", "3", and "2" and are held in this order.

Figure 9A:
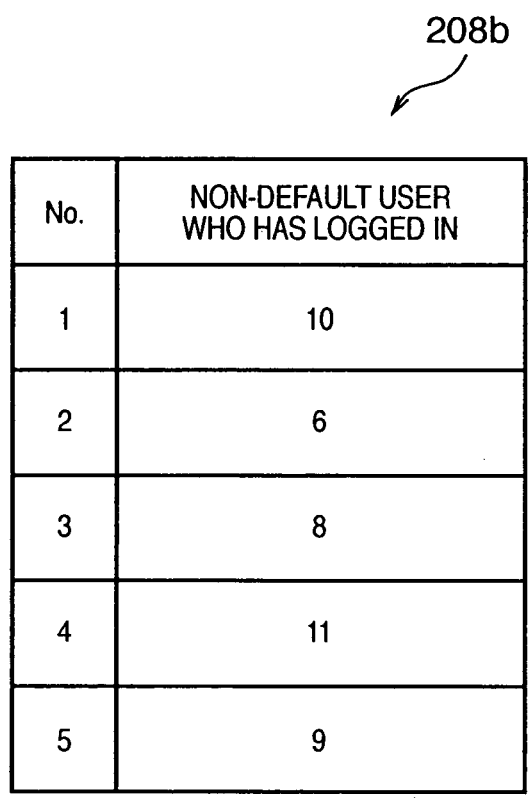
FIG. 9A and 9B are charts illustrating an updating way of login histories File for non-default users 208b.
Figure 9B:
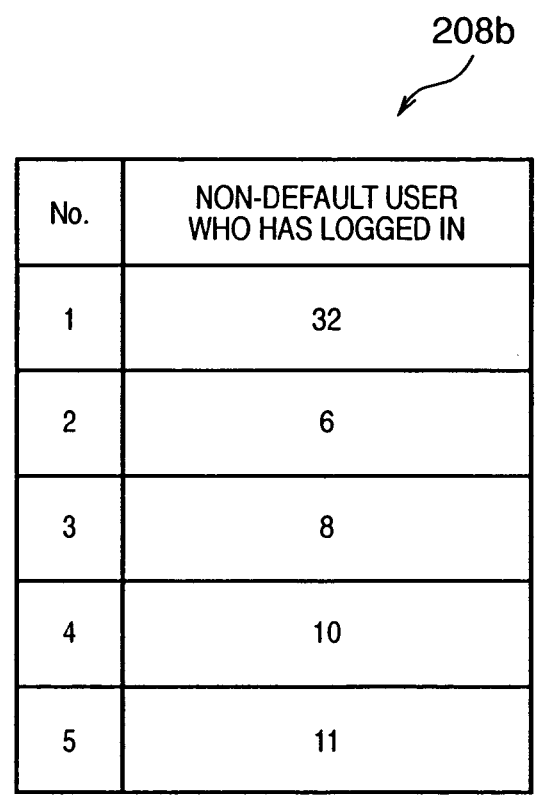

Next, an updating way of login histories File for non-default users 208b will be described with reference to FIGS. 6, 9A, and 9B. When a user of USER ID=10 whose history is held logs in from the state shown in FIG. 6, the history of USER ID=10 moves up to "1", the latest login user, and non-default users who were at "2" and "1", that is, User ID=8 and User ID=6 collectively shift to "3" and "2" and are held in this order (FIG. 9A). On the other hand, when a user whose history has not been held in the state of FIG. 6, for example, a user of USER ID=30 logs in, the user becomes the latest user. In other words, USER ID in number "1" becomes 30. Default users who were at "4", "3", "2", and "1", that is, User ID=11, User ID=10, User ID=8, and User ID=6 collectively shift to "5", "4", "3", and "2" and be held in this order. The oldest user who has logged in the state of FIG. 6 (before update) (USER ID=9) disappears from the history (FIG. 9B).

Next, user interface in a login operation on the peripheral device according to the embodiment will be described.

Figure 10:
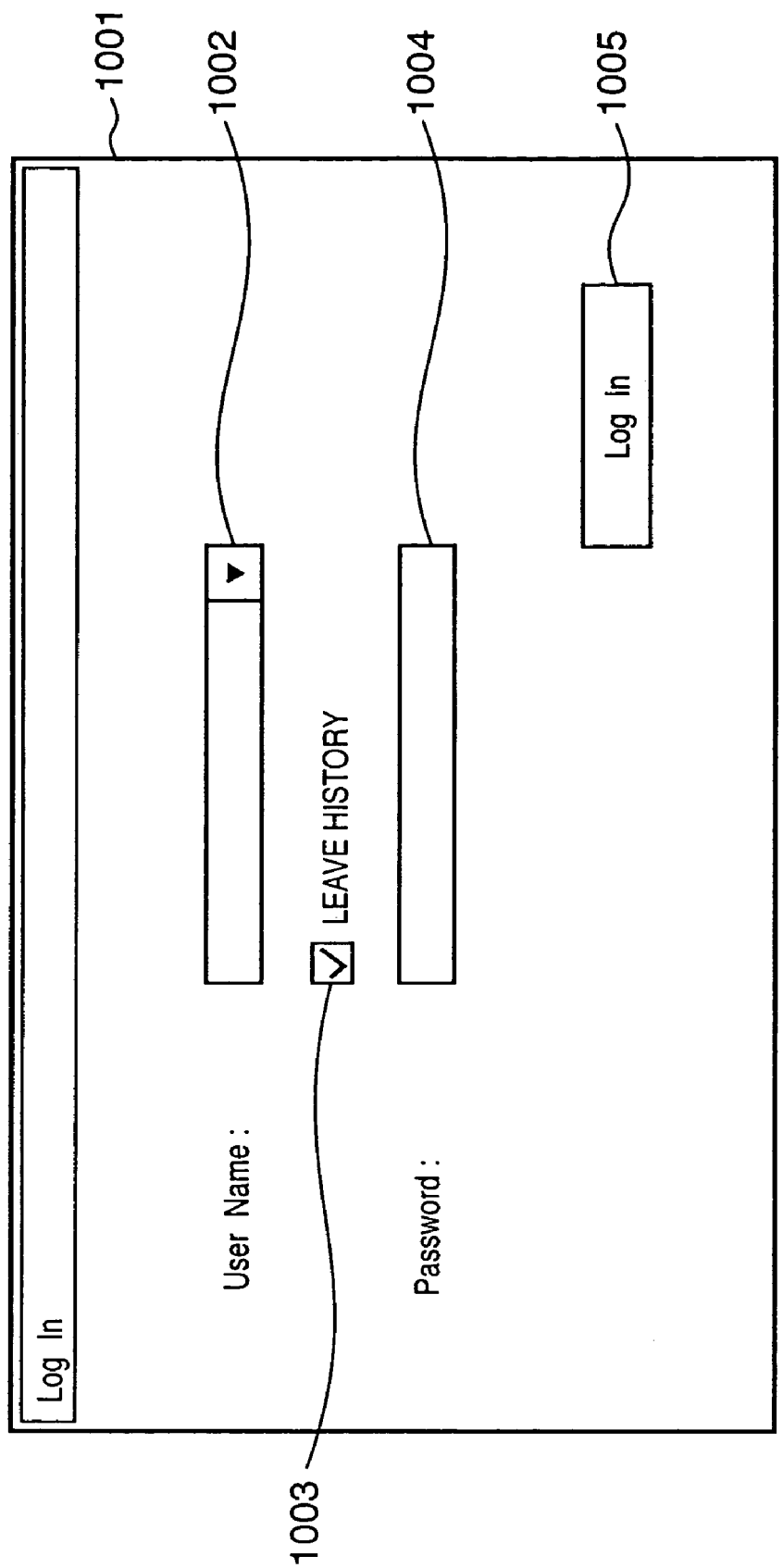
FIG. 10 is a diagram showing an exemplary login screen for login operation.

FIG. 10 shows an initial state of a login screen when a user logs in. FIG. 10 is displayed at display part 203a of operation panel 203 in FIG. 2. Although operation panel 203, display part 203a, and operation part 203b are on peripheral device 201 in this embodiment, the login screen of FIG. 10 can be displayed on PC 101, 102 connected by network 103.

Login screen 1001 consists of User Name entry box 1002 for entering User Name 302, check box 1003 for a user to select whether the user wants the device to hold the user's login history or not, Password entry box 1004 for entering password required in login authentication determination, and LogIn button 1005 to be pressed by a user to log in.

Figure 11:
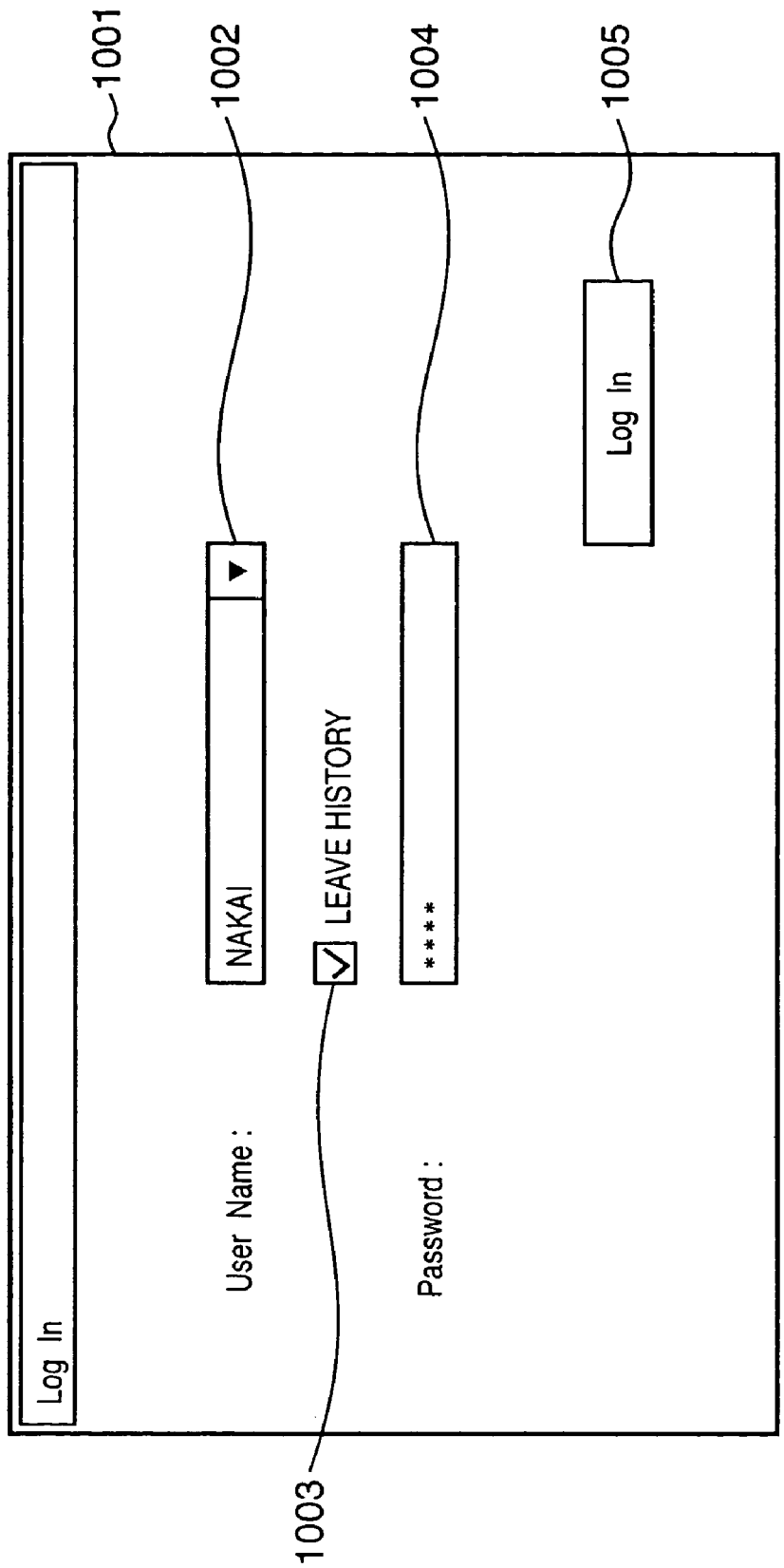
FIG. 11 is a diagram showing an exemplary login screen for login operation.

FIG. 11 shows an exemplary setting of LogIn screen when a user wants the user's login history to be held. Here, the user of User Name=NAKAI wants the peripheral device 201 to hold the user's login history (NAKAI marks the checkbox 1003) and has entered a password for authentication in Password entry box 1004. In order to log in from this state, the user presses. LogIn button 1005.

Figure 12:
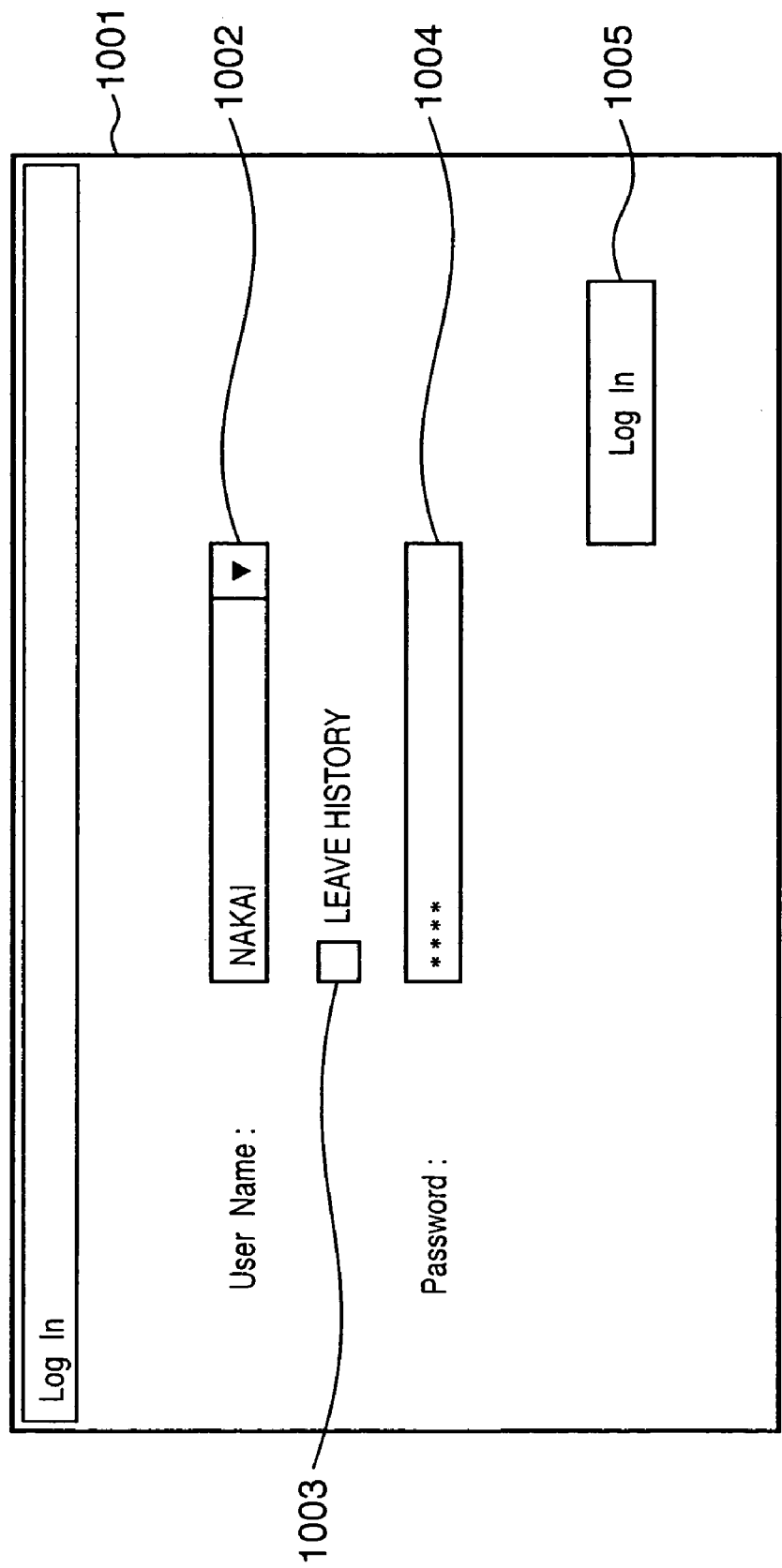
FIG. 12 is a diagram showing an exemplary login screen for login operation.

FIG. 12 shows an exemplary LogIn screen, when checkbox 1003 is not marked, which is apparent in comparison with FIG. 11, indicating that the user does not want the user's login history to be held.

Figure 13:
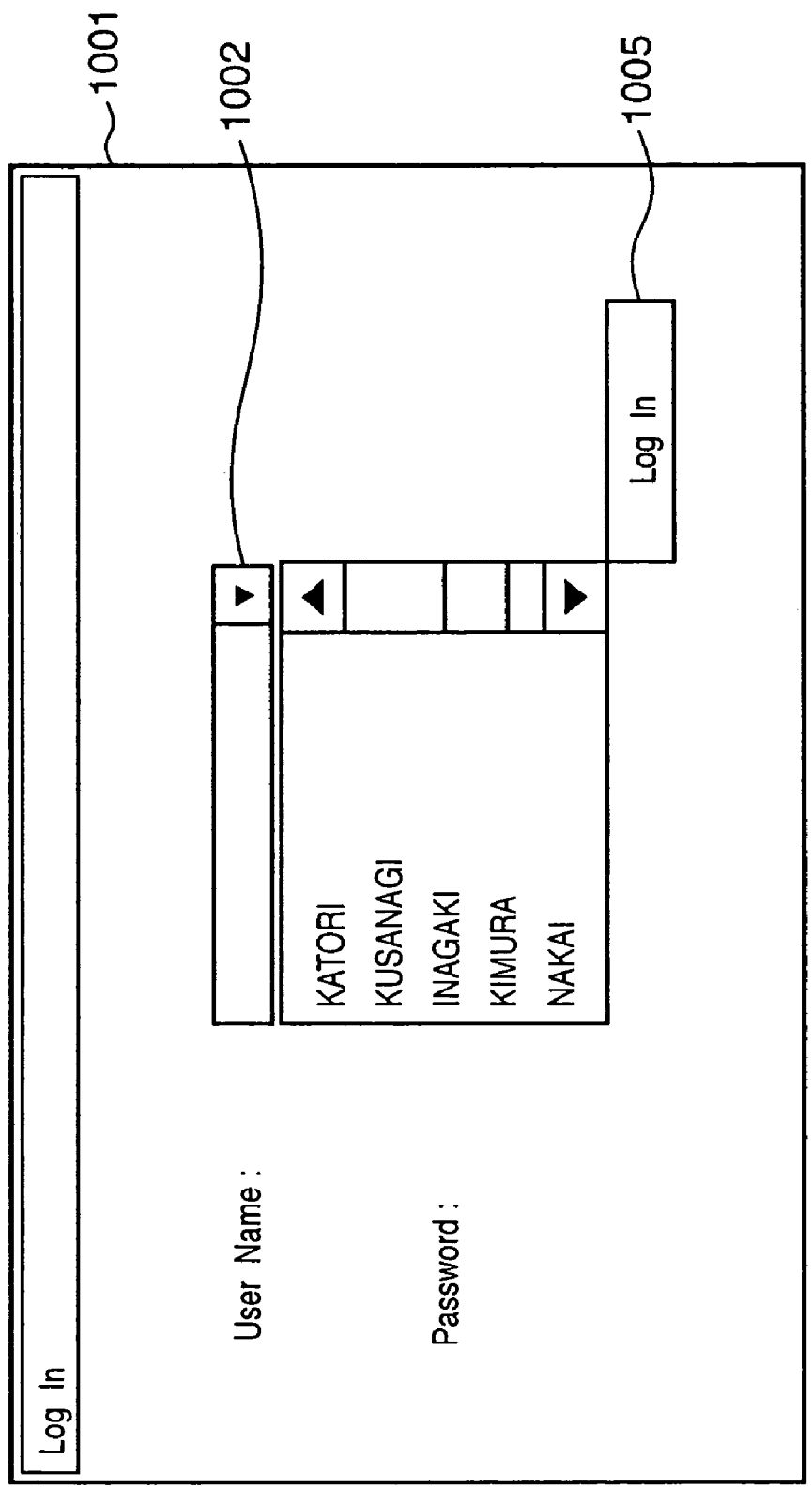
FIG. 13 is an example that displays UserNames of a plurality of users in User Name 1002 based on login histories held in a device.

FIG. 13 is an-example that displays UserNames of a plurality of users in User Name 1002 based on login histories held in a device. History information concerning five users of the default users and five users of the non-default users is held, in the embodiment, the history information concerning those users is displayed. FIG. 13 shows a screen where USER ID of default users is displayed. The number of USER NAMEs to be displayed depends on the set number of default users (FIG. 4) and the number of non-default users whose login histories can be held (FIG. 5).

User Name entry box 1002 is a list/combo box, so that the history of one or more users can be contained in a limited space 1001. It is needless to say that the entry box can be any form that makes the best of such a small space. Either default users or non-default users can be displayed in the upper part. A button for a user to select whether to display default users or non-default users can also be provided. In FIG. 13, User-Names are displayed in the login order chronologically from the bottom upward, UserName=NAKAI, KIMURA, INAGAKI, KUSANAGI, and UserName=KATORI, the last user-who has logged in.

Figure 14:
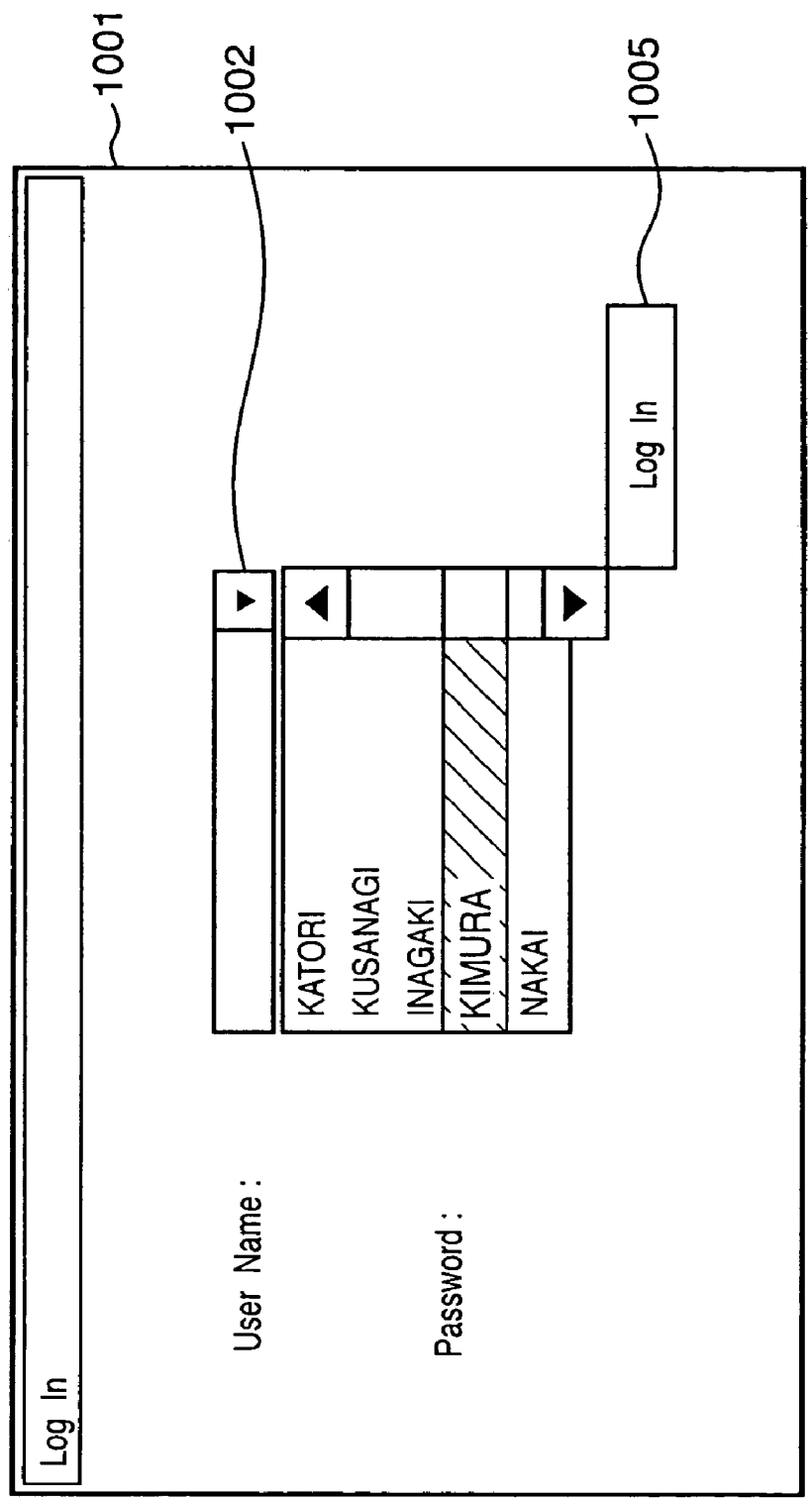
FIG. 14 is a diagram showing-a login screen of FIG. 13 with a user name being selected.

FIG. 14 shows a login screen when a user selects User Name=KIMURA from a plurality of UserNames displayed in accordance with login histories having been held-in peripheral device 201. As display space for a login screen is limited, list box 1002 is used to present a plurality of UserNames that cannot be displayed otherwise at a time. Any displaying techniques that can present all the set number of users whose login histories are to be held in a small display space, for example scrolling or page switching, can be used.

Figure 15:
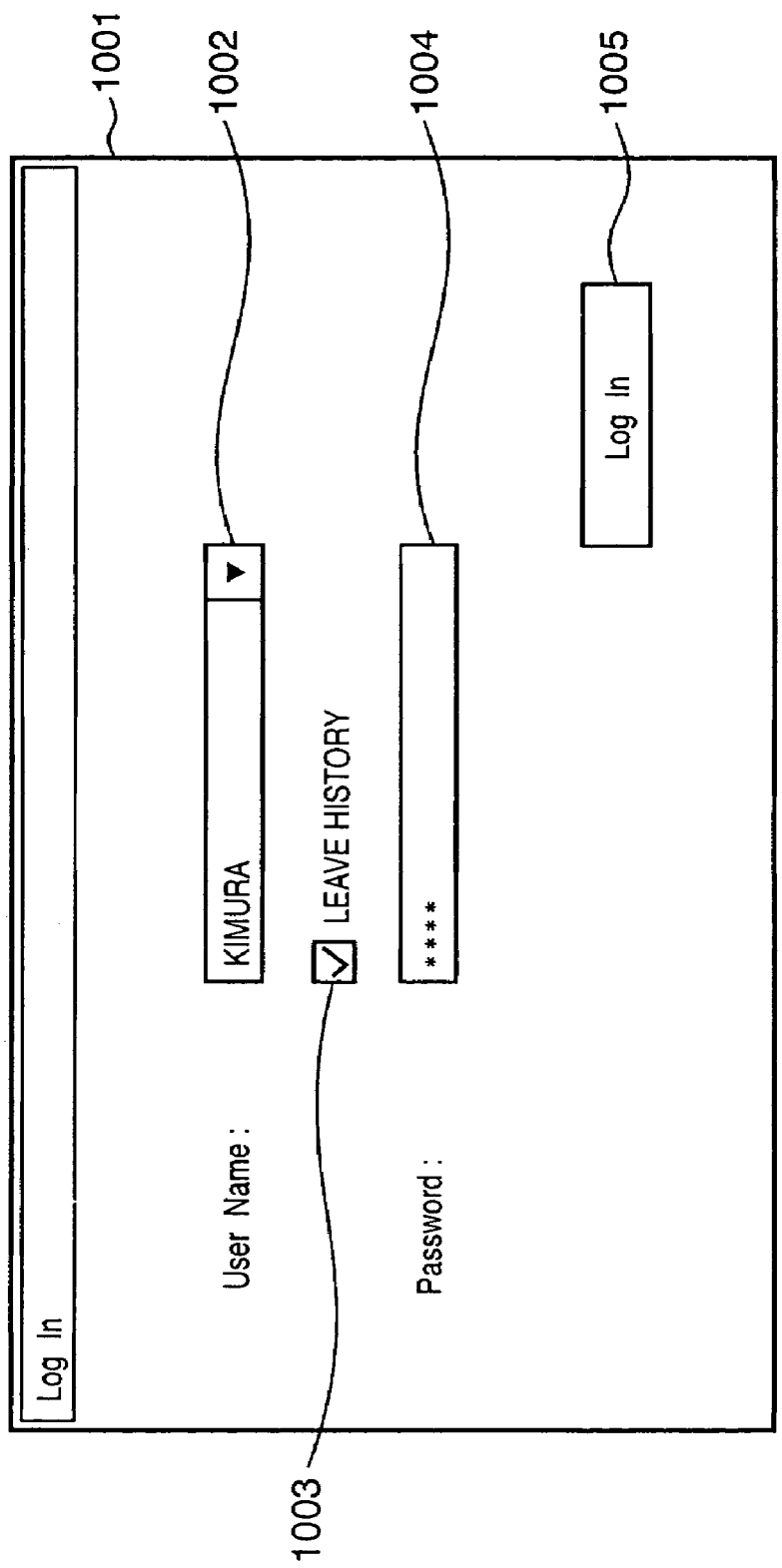
FIG. 15 is a diagram showing a login screen reflecting the user's selection shown in FIG. 14.

FIG. 15 shows a screen with User Name=KIMURA, which was selected by a user in FIG. 14, having being displayed in User Name entry box 1002, with an authentication password having being entered in Password entry box 1004, and now the user is ready to log in. Checkbox 1003 can also be automatically set according to contents of authentication DATA-File 210a at this moment. For example, with reference to authentication DataFile 210a of FIG. 3, User Name=KIMURA is User Type=1, that is, a default user and classified as history request Flag=1 (KIMURA wants a history to be held), as registered in line 307. Then, when a user selects User Name=KIMURA, checkbox 1003 indicating that the User Name is to be held is automatically marked according to this held history request Flag=1.

As default users frequently use the device, history request Flag can be fixed to 1, and "leave a history" checkbox 1003 can be left unavailable for manipulation on a login screen. In this case, checkbox 1003 can be grayed out or hidden. This can save an action of a default user's login operation.

Figure 16:
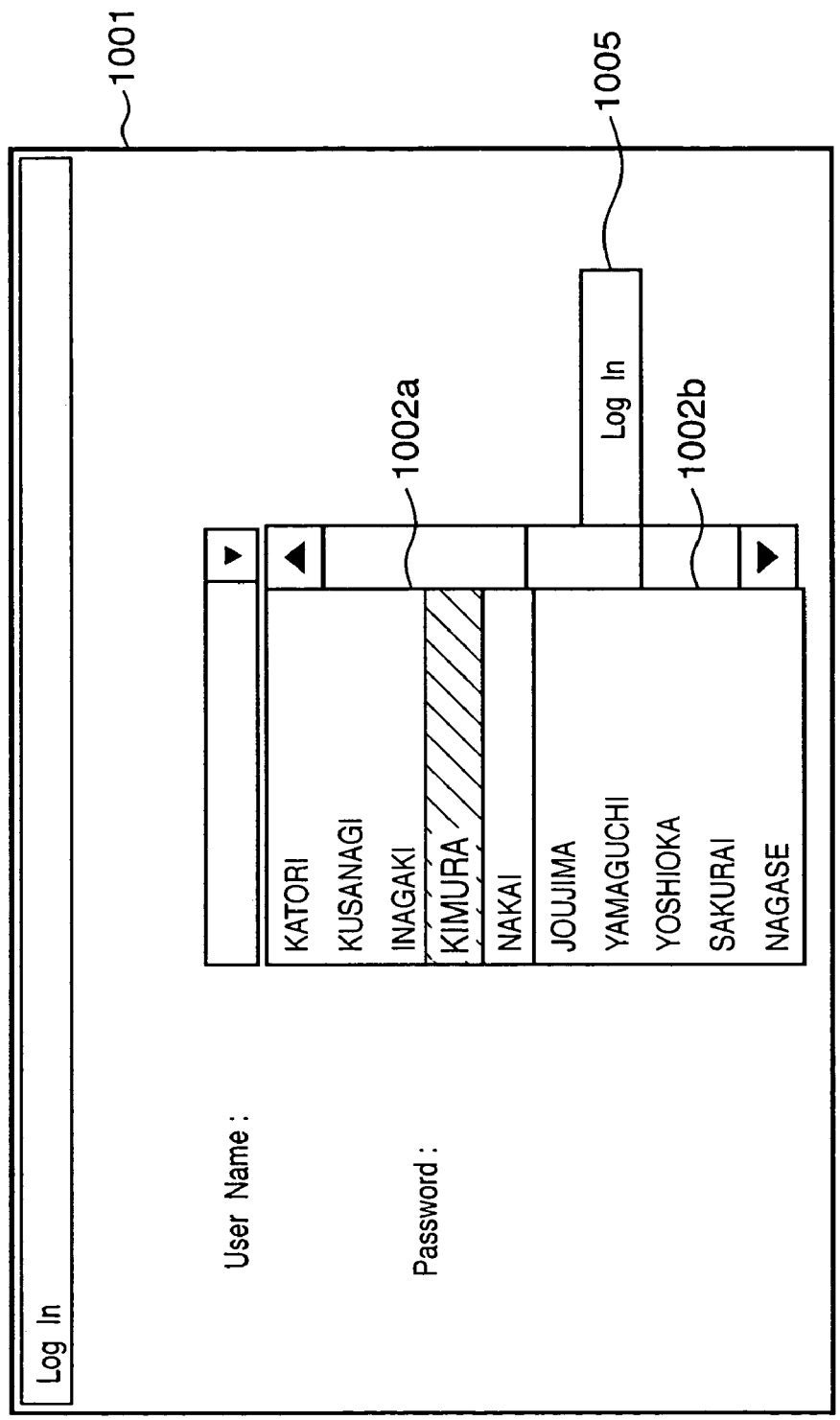
FIG. 16 is a diagram showing a login screen presenting a login histories of default users and login histories of non-default users at a time.

FIG. 16 shows a login screen 1001 with login histories of default users 1002a and login histories of non-default users 1002b being displayed in User Name 1002 at a time.

User Name 1002a displayed in the upper part of User Name 1002 displays User Name of default users obtained from the login histories of default users. It can be seen that the last default user who has logged in is User Name=KATORI.

UserName 1002b displays User Name of non-default users obtained from the login histories of non-default users. It can be seen that the non-default user who wants the login history to be held and had logged in last is User Name=JOUJIMA.

Although login histories of default users 1002a are displayed in the upper part of User Name 1002 and login histories of non-default users 1002b are displayed in the lower part of User Name 1002 in this embodiment, the histories can also be displayed in the opposite manner, or joined to make login histories of the entire users including default users and non-default users.

Figure 17:
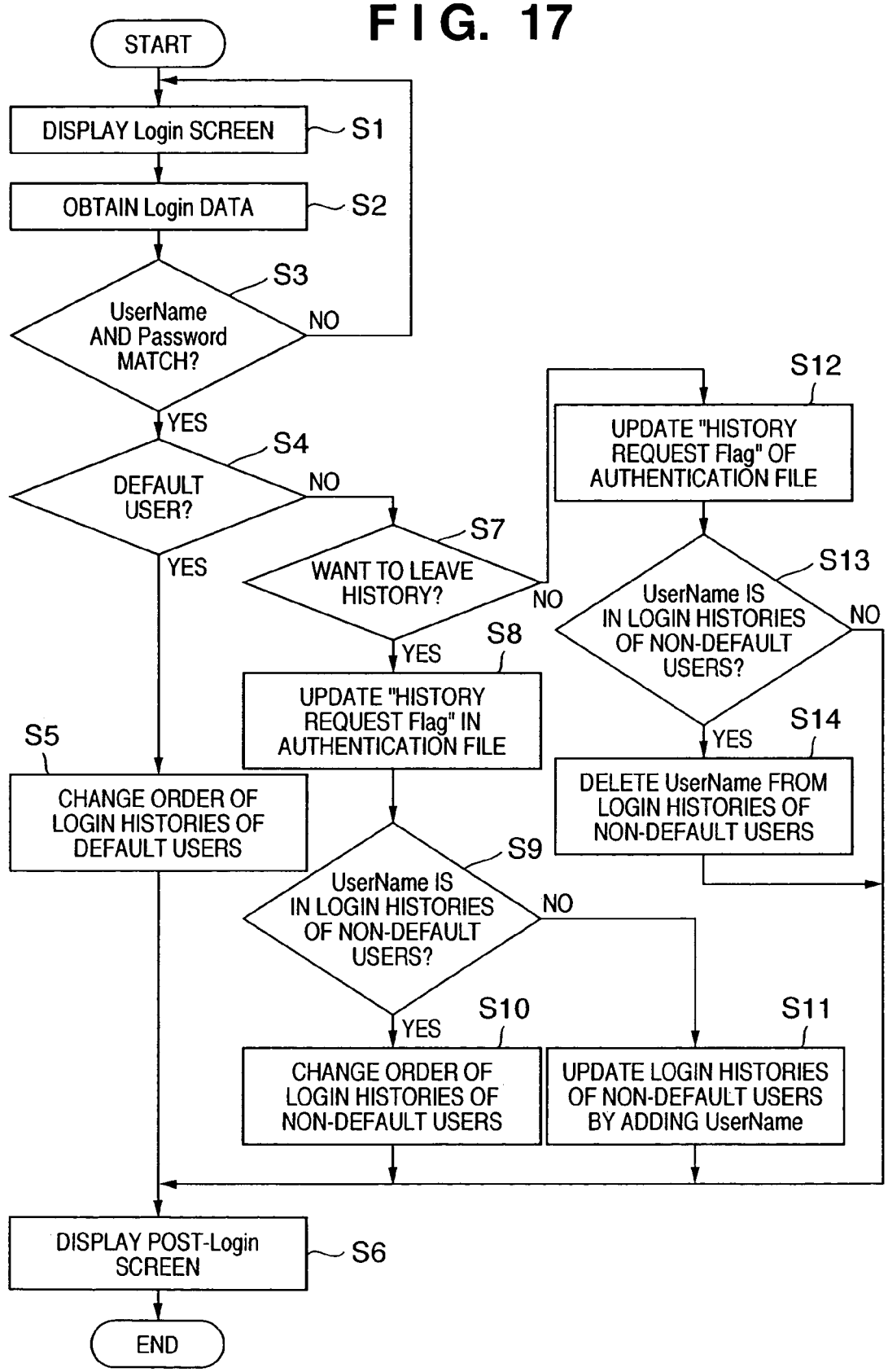
FIG. 17 is a flow chart illustrating login processes performed by a peripheral device according to the embodiment.

FIG. 17 is a flow chart illustrating login processes performed by a peripheral device 201 according to the embodiment. In terms of hardware, CPU 202 in peripheral device 201 handles determination and execution in a series of the processes. Peripheral device 201 operates in accordance with an event-driven program. In other words, when some event occurs, the device analyzes the event and executes the corresponding process. In an example below, the case where the device operates according to login information sent from operation panel of peripheral device 201 will be described.

When peripheral device 201 is activated and a user requests to log in, first at step S1, a login screen shown in FIG. 10 is displayed to the user on display part 203a. The user enters User ID and Password in User Name entry box 1002 and Password entry box 1004, respectively, and sets checkbox 1003 (FIGS. 11, 12). Then, the user selects User Name from User ID list displayed according to history information as described with reference to FIGS. 13 to 15, or FIG. 16. This facilitates the user's entering action.

Next, the process proceeds to step S2, where information entered or selected by the user (For example, in the state of FIG. 15, User Name=KIMURA, User ID=1, history request Flag=1, and Password=****) is obtained. At step S3, User Name and Password entered in entry box 1002, 1004 are determined to be correct or not by authentication DataFile 210a. If User Name and Password does not match with those registered in authentication DataFile 201a, the user is denied to be authenticated to the peripheral device concerned 201 and initial login screen (FIG. 10) is displayed again. A message that authentication is failed can also be displayed at this moment.

If a username typed or selected by a user is that of a default user, "leave a history" checkbox 1003 in the login screen can be grayed out, making the checkbox 1003 unavailable for setting as mentioned above.

On the other hand, if authentication with the entered User-Name and Password succeeds at step S3, the process proceeds to step S4, where the login user is determined whether a default user or not based on User Type 305 stored in authentication DataFile 210a.

If the user is determined to be a default user, the process proceeds to step S5, where the order of the login histories of default users 208a is changed. The order is changed as described above with reference to FIGS. 7 and 8. The process proceeds to step S6, where a post-login screen is displayed to the user on display 203a.

If the login user is determined not to be a default user (i.e., if the user is determined to be a non-default user at step S4), the process proceeds to step S7. At step S7, it is determined whether checkbox 1003 is marked or not (whether the user wants to leave a history or not). If the checkbox 1003 is marked (if the user wants to leave a history), the process proceeds to step S8, where history request Flag 306 information in authentication DataFile 201a is set to 1. Then the process proceeds to step S9, where it is determined whether User Name of the user concerned is in the login histories of non-default users 208b or not. If the User Name is in the histories, the process proceeds to step S10, where the order within login histories File for non-default users 208b is changed as described with reference to FIGS. 6 and 9A. Then the process proceeds to step S6, where a post-login screen is displayed on display part 203a.

On the other hand, if User Name of the logged in user is not in login histories of non-default users 208b at step S9, the process proceeds to step S11, where login histories of non-default users 208b are updated by adding User Name of the user as described with reference to FIGS. 6 and 9B. Then the process proceeds to step S6, where a post-login screen is displayed on display part 203a.

If checkbox 1003 is not marked at step S7 (i.e., if the user does not want to leave a history), the process proceeds to step S12, where the history request Flag 306 in authentication DataFile 210a is set to 0. Then the process proceeds to step S13, where it is determined whether User Name of the user is in login histories of non-default users 208b or not. If the User Name is not in-the histories, the process proceeds to step S6. If the User Name of the user concerned is in the histories at step S13 (i.e., the user does not want to leave a history), the process proceeds to step S14 where the User Name is deleted from the login histories of non-default users 208b and then proceeds to step S6.

Although it is assumed that histories have to be held for default users in this flow chart, updating of their history request Flag 306 and login histories of default users 208a can also be managed according to the setting of checkbox 1003 as in the same manner for non-default users. As a setting of checkbox 1003 is ignored when a login operator is a default user in this flow chart, checkbox 1003 can be grayed out.

According to the abovementioned embodiment, a peripheral device with an authentication function can set not only authentication information but also information such as each users' intention of whether to leave a login history or not, and the maximum number of users whose login histories are held. With login histories of the set number of users being held, the peripheral device can provide the minimum information to a user on a login screen which can simplify a user's login action. A user can also select whether to leave a login history or not. Thus, a user who frequently uses the device can leave a login history to log in the device merely by selecting username without typing the username from a login screen each time the user uses the device which facilitates the user's login action.

The embodiment will be summarized as below. Peripheral device 201 of the embodiment includes a login device with authentication DataFile 210a for storing authentication information on a plurality of users. This login device sets whether to leave a login history or not for each user (checkbox 1003). When a login occurs, login history is held in accordance to the setting (histories File 208a, 208b). In response to a login operation, user identification information is displayed according to the held login history (FIG. 13) and the user can select from the displayed user identification information to enter the user identification information at the login operation (FIGS. 14, 15).

The setting of whether to leave a login history or not is implemented by providing user interface (checkbox 1003) for a user to set whether to leave a login history or not on a login screen presented to the user at the login operation. The aforementioned configuration allows a user to select about holding of the login history, for example, so that a list of usernames of users who want their login histories to be held is displayed in the limited display space. In this login system, usernames appearing on the list are limited to only those of users who want their histories to be held. This makes it very easy to view the list, facilitating the login actions of users who frequently use the device.

It is also possible to make the history request Flag 306 in authentication DataFile 210a available for a device administrator to set, leaving unavailable for each user to set up. The list is easy for a user to view as only the previously limited users can appear on the list along with this way.

For example, a device administrator can also set the number of users whose login histories are held. Then, history information in the histories File (208a, 208b) is updated with histories up to the set number of users. Also, history information is administered not to contain the same user for more than once (FIGS. 8, 9). The number of usernames presented in a login process can be effectively limited, for example, by a device administrator assuming the number of users who frequently use the device and previously setting an appropriate number of login histories to be held.

Authentication information includes classification information for classifying each user as the first type (default users) or the second type (non-default users). The login histories are held for each of the first and second types (histories File 208a, 208b). This allows a device to classify its users, for example, into steady members who frequently use the device (default users) and temporal members who rarely use the device (non-default users) and to hold and display login histories for each type which further simplifies the login action.

A device administrator can also set the number of users whose login histories are held for each of the first and the second types. Then, history information is updated with histories up to the set number of users for each of the first and the second type. The latest usernames for each type of users can be displayed in the limited display space by previously setting the number of users who can be held in login histories of default users and non-default users respectively. With this login system, a login action of a user who frequently uses the device can be simplified.

The device can also be set to hold login histories for users of the first type, while providing users of the second type with a user interface to set whether to leave login histories or not on a login screen presented to the users at a login operation (steps S4, S5, S7).

It is needless to say that the purpose of the present invention can also be achieved by providing a system or a device with a storage medium storing a program code of software for implementing functions of the abovementioned embodiment, and making a computer of the system or device read out and execute the program code stored on the storage medium (or, CPU or MPU).

For example, a login system according to the embodiment mentioned above can also be implemented by a PC 101 or 102 shown in FIG. 1 according to a program installed from the outside. In this case, the present invention can even apply to the case where the program is supplied from a storage medium to the PC 101, 102, or where information including a program is loaded from an outside storage medium via network, such as E-mail or personal computer communications onto the PC 101, 102.

In the above case, the program code read out from a storage medium performs the function of the abovementioned embodiment by itself. Thus, a storage medium storing the program code forms the present invention.

A storage medium for supplying a program code, flexible disc, hard disc, optical disc, magneto-optical disc, CD-ROM, CD-R, magnetic tape, non-volatile memory card, ROM, etc. can be used.

It is needless to say that the present invention includes the case where not only the function of the abovementioned embodiment is implemented, but also an OS (operating system) or the like running on the computer performs all or a part of the actual processing as indicated by the program code, which implements the abovementioned function of the embodiment.

It is also needless to say that the present invention also includes the case where after a program code read out from a storage medium is written on a feature expansion board inserted to a computer or memory attached to a feature expansion unit connected to a computer, the feature expansion board or CPU provided on the feature expansion unit performs all or a part of the actual processing as indicated by the program code and the function of the abovementioned embodiment is implemented by the processing.

As mentioned above, the present invention simplifies a user's login operation.

As many apparently widely different embodiments of the present invention can be made without departing from the spirit and scope thereof, it is to be understood that the invention is not limited to the specific embodiments thereof except as defined in the appended claims.

What is claimed is:

1. A device for performing a login process by using user identification information of a user input in an entry screen, comprising:

a storage unit that stores user identification information of each of a plurality of users including a first type of user and a second type of user, and user type information indicating whether each of the plurality of users corresponds to the first type of user or the second type of user;

a login history setting unit that sets information whether to hold a login history for each user of the plurality of users, the login history being used for entering the user identification information in the entry screen;

a holding unit that holds the login history for each user in accordance with the information set by the login history setting unit;

a displaying unit that displays the user identification information of users in which the information to hold the login history has been set based on the login history held in the holding unit;

an entering unit that enters the user identification information of a user;

a determining unit that determines whether the entered user identification information corresponds to the first type of user or the second type of user based on the user type information stored in the storage unit;

a controlling unit that causes the holding unit to hold the login history of the user corresponding to the entered user identification information without requesting the user to set the information whether to hold the login history in a case where the determining unit determines that the entered user identification information corresponds to the first type of user, and controls to request the user to set the information whether to hold the login history in a case where the determining unit determines that the entered user identification information corresponds to the second type of user; and a number of histories setting unit that sets the number of users whose login histories are held by the holding unit for each of the first type of user and the second type of user, wherein the entering unit enters the user identification information in a case where any of the user identification information displayed on the displaying unit is selected, and the holding unit holds login histories independently for each of the first type of user and the second type of user up to the number of users set by the number of histories setting unit.

2. The device according to claim 1, wherein the login history setting unit provides a user interface for allowing the user to set whether to hold the login history on a login screen presented to the user at a login operation.

3. The device according to claim 1, wherein the login history is managed so as not to contain information on the user for a plurality of times.

4. The device according claim 1, wherein the login history setting unit automatically sets the login history to be held for the first type of user and provides a user interface allowing the second type of user to set whether to hold the login history on a login screen presented to the user at a login operation.

5. A data processing device displaying an entry screen for entering user identification information and password information for a login process, comprising:
a storage unit that stores user identification information and password information for each of a plurality of users, the user identification information and the password information being associated with each other, and user type information indicating whether each of the plurality of users corresponds to the first type of user or the second type of user;
a login history setting unit that sets information whether to hold the user identification information which is to be used for entering the user identification information in the entry screen;
a display controlling unit to that allows a display unit to display the user identification information that is set to be held by the login history setting unit on the entry screen;
an entering unit that enters the user identification information and the password information on the entry screen;
a determining unit that determines whether the entered user identification information corresponds to the first type of user or the second type of user based on the user type information stored in the storage unit;
a controlling unit that causes a holding unit to hold login history of the user corresponding to the entered user identification information without requesting the user to set information whether to hold the login history in a case where the determining unit determines that the entered user identification information corresponds to a first type of user, and that controls to request the user to set the information whether to hold the login history in a case where the determining unit determines that the entered user identification information corresponds to a second type of user; and
a number of histories setting unit that sets the number of users whose login histories are held by the holding unit for each of the first type of user and the second type of user,
wherein the entering unit enters the user identification information in a case where the user identification information displayed on the entry screen by the display controlling unit is selected,
and the holding unit holds login histories independently for each of the first type of user and the second type of user up to the number of users set by the number of histories setting unit.

6. The device according to claim 5, further comprising a number setting unit that sets the number of the user identification information which can be set to be held by the login history setting unit.

7. A login controlling method executed by a device for performing a login process by using user identification information of a user input in an entry screen, comprising the steps of:
storing, in a memory, user identification information for each of a plurality of users, the plurality of users including a first type of user and a second type of user, and user type information indicating whether each of the plurality of users corresponds to the first type of user or the second type of user;
a login history setting step of setting information whether to hold a login history for each user of the plurality of users for entering the user identification information in the entry screen;
holding the login history for each user in the memory in accordance with the setting set at said login history setting step;
displaying, on a display, the user identification information of users in which the information to hold the login history has been set based on the held login history held at said holding step;
entering, in a login screen, user identification information of a user;
determining whether the entered user identification information corresponds to the first type of user or the second type of user based on the user type information stored in the memory;
causing the holding step to hold the login history for the entered user identification information without requesting the user to set the information whether to hold the login history in a case where it is determined that the entered user identification information corresponds to the first type of user;
requesting the user to set the information whether to hold the login history in a case where it is determined that the entered user identification information corresponds to the second type of user; and
a number of histories setting step of setting the number of users whose login histories are held by the holding step for each of the first type of user and the second type of user,
wherein, in a case where any of the displayed user identification information is selected, the user identification information is entered,
and the holding unit holds login histories independently for each of the first type of user and the second type of user up to the number of users set by the number of histories setting step.

8. The method according to claim 7, wherein a user interface for allowing the user to set the information whether to hold a login history is presented to the user on the login screen at a login operation.

9. The method according to claim 7, wherein the login history is managed so as not to contain information on the user for a plurality of times.

10. The method according to claim 7, wherein login histories are automatically set to be held for the first type of user and a user interface allowing the second type of user to set information whether to hold the login history is provided on the login screen presented to the user at a login operation.

11. A data processing method for displaying, on a data processing device, an entry screen for entering user identification information and password information for a login process, comprising the steps of:
storing, in a storage unit, user identification information and password information for each of a plurality of users, the user identification information and the password information being associated with each other, and user type information indicating whether each of the plurality of users corresponds to the first type of user or the second type of user;

a login history setting step of setting information whether to hold user identification information which is to be used for entering the user identification information in the entry screen;

allowing a display unit to display the user identification information that is set to be held at said login history setting step on the entry screen;

entering, on the entry screen, user identification information and password information;

determining whether the entered user identification information corresponds to the first type of user or the second type of user based on the user type information in the storage unit;

causing a holding unit to hold login history of the user corresponding to the entered user identification information without requesting the user to set the information whether to hold the login history in a case where it is determined that the entered user identification information corresponds to a first type of user;

requesting the user to set the information whether to hold the login history in a case where it is determined that the entered user identification information corresponds to a second type of user; and a number of histories setting step of setting the number of users whose login histories are held by the holding unit for each of the first type of user and the second type of user, wherein the user identification information is entered in the entering step in a case where any of the displayed user identification information is selected, and the holding unit holds login histories independently for each of the first type of user and the second type of user up to the number of users set by the number of histories setting step.

12. The method according to claim 11, further comprising setting the number of user identification information which can be set to be held at the login history setting step.

13. A computer-readable storage medium on which is stored a computer- executable program for implementing a login controlling method by a device for performing a login process by using user identification information of a user input in an entry screen, comprising the steps of:

storing, in a memory, user identification information for each of a plurality of users, the plurality of users including a first type of user and a second type of user, and user type information indicating whether each of the plurality of users corresponds to the first type of user or the second type of user;

a login history setting step of setting information whether to hold a login history for each user of the plurality of users, the login history being for entering the user identification information in the entry screen;

holding the login history for each user in the memory in accordance with the setting set at said setting step;

displaying, on a display, the user identification information of users in which the information to hold the login history has been set based on the held login history held at said holding step;

entering, in a login screen, user identification information;

determining whether the entered user identification information corresponds to the first type of user or the second type of user based on the user type information stored in the memory;

causing the holding step to hold the login history for the entered user identification information without requesting the user to set the information whether to hold the login history in a case where it is determined that the entered user identification information corresponds to the first type of user;

requesting the user to set the information whether to hold the login history in a case where it is determined that the entered user identification information corresponds to the second type of user; and a number of histories setting step of setting the number of users whose login histories are held by the holding unit for each of the first type of user and the second type of user, wherein, in a case where any of the displayed user identification information is selected, the user identification information is entered, and the holding step holds login histories independently for each of the first type of user and the second type of user up to the number of users set by the number of histories setting step.

14. A computer-readable storage medium on which is stored a computer-executable program for implementing a data processing method for displaying, on a data processing device, an entry screen for entering user identification information and password information for a login process, comprising the steps of:

storing, in a storage unit, user identification information and password information for each of a plurality of users, the user identification information and the password information being associated with each other, and user type information indicating whether each of the plurality of users corresponds to the first type of user or the second type of user;

a login history setting information whether to hold user identification information which is to be used for entering the user identification information in the entry screen;

allowing a display unit to display the user identification information that is set to be held at said setting step on the entry screen;

entering, on the entry screen, user identification information and password information;

determining whether the entered user identification information corresponds to the first type of user or the second type of user based on the user type information in the storage unit;

causing a holding unit to hold login history of the user corresponding to the entered user identification information without requesting the user to set the information whether to hold the login history in a case where it is determined that the entered user identification information corresponds to a first type of user;

requesting the user to set the information whether to hold the login history in a case where it is determined that the entered user identification information corresponds to a second type of user; and a number of histories setting step of setting the number of users whose login histories are held by the holding unit for each of the first type of user and the second type of user, wherein the user identification information is entered in the entering step in a case where any of the displayed user identification information is selected, and the holding unit holds login histories independently for each of the first type of user and the second type of user up to the number of users set by the number of histories setting step.

* * * * *